US011418972B2

(12) United States Patent
Reial et al.

(10) Patent No.: US 11,418,972 B2
(45) Date of Patent: Aug. 16, 2022

(54) METHOD AND APPARATUS FOR CONFIGURING BEAMFORMING OPERATIONS IN A WIRELESS COMMUNICATION NETWORK

(71) Applicant: Telefonaktiebolaget LM Ericsson (publ), Stockholm (SE)

(72) Inventors: Andres Reial, Malmo (SE); Icaro L. J. Da Silva, Solna (SE); Johan Rune, Lidingo (SE); Henrik Sahlin, Molnlycke (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 561 days.

(21) Appl. No.: 16/342,609

(22) PCT Filed: Dec. 11, 2018

(86) PCT No.: PCT/EP2018/084362
§ 371 (c)(1),
(2) Date: Apr. 17, 2019

(87) PCT Pub. No.: WO2020/119893
PCT Pub. Date: Jun. 18, 2020

(65) Prior Publication Data
US 2021/0360429 A1 Nov. 18, 2021

(51) Int. Cl.
*H04W 16/28* (2009.01)
*H04B 7/06* (2006.01)
*H04W 8/24* (2009.01)

(52) U.S. Cl.
CPC .......... *H04W 16/28* (2013.01); *H04B 7/0617* (2013.01); *H04W 8/24* (2013.01)

(58) Field of Classification Search
CPC .. H04W 72/042; H04W 76/27; H04L 5/0053; H04L 5/0055; H04L 1/1812
(Continued)

(56) References Cited

U.S. PATENT DOCUMENTS

2015/0382268 A1* 12/2015 Hampel ............... H04B 7/0617
455/436
2016/0044517 A1 2/2016 Raghavan et al.
(Continued)

FOREIGN PATENT DOCUMENTS

WO 2013086164 A1 6/2013
WO 2018085601 A1 5/2018

OTHER PUBLICATIONS

PCT International Search Report, dated Aug. 13, 2019, in connection with International Application No. PCT/EP2018/084362, all pages.
(Continued)

*Primary Examiner* — Sam K Ahn
*Assistant Examiner* — Gina M McKie
(74) *Attorney, Agent, or Firm* — Leffler Intellectual Property Law, PLLC

(57) ABSTRACT

A wireless communication device transmits beam sweeping information that indicates a beam sweeping property of the device, and a network node in an associated wireless communication network configures transmission or reception beamforming with respect to the device at one or more Transmission/Reception in the network, based on the beamforming property. Among the various advantages flowing from configuring network-side beamforming for the device in view of the beamforming property, the network need not configure its beamforming operations according to worst-case or minimum-capability assumptions for the device, and, instead tailors its transmission or reception beamforming in dependence on the beamforming property of the device.

17 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0373740 A1* | 12/2017 | Guo | H04L 5/0028 |
| 2018/0070343 A1* | 3/2018 | Chen | H04W 56/0015 |
| 2018/0212651 A1* | 7/2018 | Li | H04B 7/0686 |
| 2018/0227094 A1* | 8/2018 | Liu | H04L 5/0094 |
| 2018/0288756 A1 | 10/2018 | Xia et al. | |
| 2018/0332659 A1* | 11/2018 | Hwang | H04W 74/0833 |
| 2019/0141693 A1* | 5/2019 | Guo | H04W 72/042 |
| 2019/0165831 A1* | 5/2019 | Zhou | H04B 1/713 |
| 2019/0320337 A1 | 10/2019 | Siomina et al. | |
| 2020/0037360 A1 | 1/2020 | Qian et al. | |
| 2020/0092737 A1 | 3/2020 | Siomina et al. | |
| 2020/0228268 A1 | 7/2020 | Cao | |
| 2020/0322915 A1 | 10/2020 | Zhang et al. | |
| 2021/0028850 A1 | 1/2021 | Elliott et al. | |
| 2021/0112541 A1 | 4/2021 | Manolakos et al. | |
| 2021/0360430 A1 | 11/2021 | Reial et al. | |

OTHER PUBLICATIONS

PCT Written Opinion, dated Aug. 13, 2019, in connection with International Application No. PCT/EP2018/084362, all pages.
PCT International Search Report, dated Aug. 12, 2019, in connection with International Application No. PCT/EP2018/084361, all pages.
PCT Written Opinion, dated Aug. 12, 2019, in connection with International Application No. PCT/EP2018/084361, all pages.
Non-Final Office Action dated Sep. 17, 2021 in connection with U.S. Appl. No. 16/342,658, 13 pages.
Notice of Allowance dated Dec. 16, 2021 in connection with U.S. Application No. 16/342,658, 10 pages.

* cited by examiner

METHOD AND APPARATUS FOR CONFIGURING BEAMFORMING OPERATIONS IN A WIRELESS COMMUNICATION NETWORK

TECHNICAL FIELD

The present invention relates to configuring beamforming operations in a wireless communication network.

BACKGROUND

"Beamforming" refers to the use of directional signal transmission or reception, as compared to omnidirectional signal transmission or reception. Beamforming has increasing importance in the development of wireless communication networks. An example case involves the New Radio (NR) or so-called "5G" network technology under development by the Third Generation Partnership Project (3GPP). Beamforming by Transmission/Reception Points (TRPs) in 5G networks and by the wireless communication devices supported by such networks plays a pivotal role in extending the reach of communication signals at higher frequencies.

A mobile phone or another type of wireless communication device improves its signal reception by "scanning" in different angular directions, using reception beamforming. Reception quality of the received signal is best for the receiver beam most closely aligned with the angle of arrival of the incoming signal, which may have been directionally transmitted or omnidirectionally transmitted by a TRP in the network. Similarly, the device improves received-signal quality at the TRP by concentrating the energy of its transmitted signal directionally, towards the TRP.

When searching for critical network signals, such as downlink synchronization signals or other reference signals, the device attempts signal reception in multiple directions. In some instances, the device has no basis for guessing at the best directions or eliminating certain directions, and it performs reception beamforming over an entire sphere, over a half-sphere, or over some other defined "full" range of directional scanning. In other instances, the device knows the most likely directions or can eliminate certain directions, so that the angular range spanned by its reception beamforming is less than the full range. Similar situations apply regarding transmit beamforming, where the angular range for transmit beamforming may span an entire sphere or may span a reduced angular range.

SUMMARY

A wireless communication device transmits beam sweeping information that indicates a beam sweeping property of the device, and a network node in an associated wireless communication network configures transmission or reception beamforming with respect to the device at one or more Transmission/Reception (TRPs) in the network, based on the beamforming property. Among the various advantages flowing from configuring network-side beamforming for the device in view of the beamforming property, the network need not configure the beamforming operations according to worst-case or minimum-capability assumptions for the device, and, instead tailors its transmission or reception beamforming in dependence on the indicated beamforming property of the device.

One embodiment of a method of operation by a network node in a wireless communication network includes the node receiving beam sweeping information from a wireless communication device. The received information indicates a beam sweeping property of the device with respect to performing directional reception or transmission and the node determines a beam sweep configuration to be used by a TRP in the network with respect to the device, in dependence on the beam sweeping property.

In a corresponding embodiment of a network node, the node includes communication circuitry configured for wireless communication with wireless communication devices or configured for inter-nodal communication with another network node in the network that is configured for wireless communication with wireless communication devices. The node further includes processing circuitry operatively associated with the communication circuitry and configured to receive beam sweeping information from a wireless communication device. The received information indicates a beam sweeping property of the device with respect to performing directional reception or transmission and the processing circuitry is configured to determine a beam sweep configuration to be used by a TRP in the network with respect to the device, in dependence on the beam sweeping property.

Complementary device-side operations include, in one embodiment of a method of operation by a wireless communication device configured for operation in a wireless communication network, determining a beam sweeping property of the device with respect to the device performing directional reception or transmission. The method further includes transmitting beam sweeping information indicating the beam sweeping property, for use by a network node in configuring a beam sweep to be used by TRP in the network, with respect to the device performing the directional reception or transmission.

In a related embodiment, a wireless communication device configured for operation with a wireless communication network includes communication circuitry and processing circuitry. The communication circuitry is configured for wireless communication with TRPs in the network, and the processing circuitry is operatively associated with the communication circuitry. The processing circuitry is configured to determine a beam sweeping property of the device with respect to the device performing directional reception or transmission, and transmit beam sweeping information indicating the beam sweeping property, for use by a network node in configuring a beam sweep to be used by a TRP, with respect to the device performing the directional reception or transmission.

An example embodiment of a wireless communication system includes a wireless communication device and a network node. The wireless communication device includes communication circuitry configured for wireless communication with TRPs in a wireless communication network, and processing circuitry operatively associated with the communication circuitry and configured to determine a beam sweeping property of the device with respect to the device performing directional reception or transmission, and transmit beam sweeping information indicating the beam sweeping property, for use by a network node in the network, where the network comprises a further part of the system.

The network node includes communication circuitry configured for wireless communication with the device as said TRP or configured for inter-nodal communication with the TRP. The network node further includes processing circuitry that is operatively associated with the communication circuitry and configured to receive the beam sweeping information and determine a beam sweep configuration to be used by the TRP with respect to the device, in dependence on the beam sweeping property.

The present invention, however, is not limited to the above features and advantages. Persons of ordinary skill in the art will recognize additional features and advantages upon reading the following detailed description, and upon viewing the accompanying drawings.

DETAILED DESCRIPTION

Figure 2:
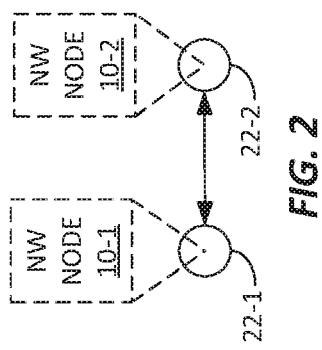
FIG. 2 is a block diagram of another network embodiment, including respective network nodes implemented at respective TRPs, each network node operative to configure beam sweeping operations at its respective TRP.

As a non-limiting advantage of network and device embodiments detailed herein, beam sweeping operations performed at a Transmission/Reception Point (TRP) in a wireless communication network with respect to a wireless communication device (WCD) depend on a beam sweeping property learned for the WCD. Tailoring beam sweeping at the TRP in dependence on the beam sweeping property of the WCD allows the network to save resources—e.g., time or frequency resources-when the WCD has beam sweeping capabilities better than a baseline capability that might otherwise be assumed.

Consider the difference between radio frequency or analog beamforming versus baseband or digital beamforming. A WCD that uses analog beamforming for directional reception may be able to receive in only one direction at a time. When searching for a downlink signal over some number of directional beams, the WCD monitors for the signal in each of the directions, one at a time. Therefore, the time needed by the device to complete its reception beam sweep over the involved angular range depends on the per-beam monitoring duration and on the number of beams used to span the angular range. Conversely, baseband or digital beamforming allows the WCD to receive in multiple directions or all directions simultaneously, meaning that the WCD may need only one monitoring interval to capture a signal incoming from any direction (angle of arrival) within the angular range. The received signal is converted to a digital representation and the WCD can thereafter process (i.e. postprocess) the digital signal and apply different receive beamforming parameters to it. That is, the WCD can try different receive beam directions at the postprocessing stage.

One aspect of beamforming involves the concept of a "beam sweep length," which may be expressed as the number of beams used. Correspondingly, the "beam position" in a defined beam sweep refers to a particular one of the beam directions spanned or covered by the sweep. Even when indicating or defining the "beam sweep length" as the number of beams used, the corresponding temporal "length" of the beam sweep is known from the duration of each beam, the number of times each beam is used in the sweep, and whether the beams are used successively or simultaneously.

Thus, a reception beam sweep length may be understood as the number of beams used to receive over a defined angular range. The time needed for the reception beam sweep therefore depends on the reception interval used for each beam, and whether the receiver receives in more than one beam direction at a time. The reception time per beam may be predefined. e.g., in terms of a reception window corresponding to a known or expected transmission interval defined, e.g., in terms of Transmission Time Intervals (TTIs), symbol times, or other defined unit of time. Similarly, a transmission beam sweep length may be understood as the number of beams used to transmit over a defined angular range, with the temporal length of the transmission beam sweep depending on the transmission interval used for each beam—e.g., the number of symbol times spanned by the transmission in each beam direction—and on the beam repetition factor and whether the transmitter transmits in more than one direction at a time.

The "beam repetition factor" refers to the fact that a transmitter may perform the transmission of interest once in each beam direction or may repeat the transmission of interest in each beam direction. For example, assume the receiver in question has a reception beam sweep length of six beams—i.e., it tries six different reception directions in one reception beam sweep—and it receives in one beam at a time. Further, assume that the transmitter in question uses a transmission beam sweep length of six beams—i.e., it transmits in six different beam directions over one beam sweep. Finally, assume that the goal is to identify the best pairing of transmit beam direction and receive beam direction. In this scenario, and assuming that the receiver provides the transmitter with beam sweep information indicating the reception beam sweep configuration used by the receiver, the transmitter repeats the transmission of interest—e.g., a reference signal transmission for channel strength/quality estimation at the receiver—six times in each direction. The repetition factor of six in the transmission beam sweep allows the receiver to try each of its six reception directions for all six of the transmission directions.

Here, it may be helpful to note that a TRP in a wireless communication network may operate with a configured "beam set size" that defines the number of beams it uses, e.g., when performing a transmission beam sweep. Thus, the term "combined beam sweep duration" can be understood as referring to the total duration of a combined transmission/ reception beam sweep—e.g., the total duration of a transmission beam sweep performed by a TRP with respect to a WCD and the corresponding reception beam sweep performed by the WCD.

It may also be helpful to note that the angular range used for reception or transmission beamforming may be a default value or a determined value. For example, in the absence of having any information about the expected or most likely angles-of-arrival for signals incoming to a receiver, the receiver may use a beam set that spans a full sphere, or some portion or area thereof. Similarly, a transmitter may transmit over a default angular range or area, unless it has knowledge about the "best" or most likely directions to try. Such knowledge may also be used to prioritize or restrict transmission directions.

The time needed for a WCD to perform a reception beam sweep depends, in a useful example, on whether the WCD uses analog or digital beamforming for directional reception. In the former case, the total reception time needed depends on the beam sweep length. The broader point to appreciate is that whether or to what extent the WCD supports reception in multiple directions simultaneously influences the length of time needed by the WCD to perform directional reception.

Correspondingly, resources needed by a TRP to perform a corresponding transmission beam sweep depends on how the WCD performs its reception beam sweep. If the WCD receives in only one direction at a time, the TRP needs to repeat the signal in question a number of times in each transmit direction, so that the WCD has the opportunity to sweep through its individual reception beams for each transmit direction. Signal repetition in a beam direction, which is also referred to as "beam repetition," consumes additional resources at the TRP. As an advantageous recognition herein, the TRP can avoid performing repetition or control the extent of repetition, based on knowing how the WCD performs directional reception.

Considerations of beamforming capability also apply with respect to directional transmission by the WCD. Interesting variables in the directional transmission scenario include the number of transmit directions used by the WCD to span the involved angular range (i.e., the transmission beam sweep length), and whether or to what extent the WCD transmits in multiple directions simultaneously. The angular span and the size or shape of the transmission beams used by the WCD determines the number of transmission beams used, whereas transmission power limits at the WCD may dictate the number of transmit beams that the WCD can transmit simultaneously, e.g., in case it is using digital transmit beamforming, or the width of transmitted beams, e.g., in case it is using analog transmit beamforming. Here, the number of separate beam transmission times and the transmission duration of each beam transmission determines the length of the transmission beam sweep at the WCD. A maximum or worst-case sweep duration corresponds to a maximum number of beams transmitted one at a time. By knowing how the WCD performs directional transmission— e.g., knowing the transmission beam sweep length and/or how many beams the WCD transmits simultaneously—the appropriate amount of reception resources can be reserved and used at the TRP for reception beamforming with respect to the WCD.

Rather than configuring transmission or reception beam sweeping at a TRP in dependence on worst-case or baseline beam sweeping capabilities, a WCD herein sends beam sweeping information indicating a beam sweeping property of the WCD. A node in the network configures a corresponding reception or transmission beam sweep at the TRP, in dependence on the reported property. For example, the beam sweeping property indicates whether the WCD uses analog or digital beamforming for directional reception, perhaps along with the number receive beams used at the WCD, and the network node configures a transmission beam sweep at the TRP in dependence on the reported property.

In at least one embodiment, the beam sweeping property indicated by the WCD indicates at least whether the WCD receives in one direction at a time or receives in multiple directions simultaneously. The information indicates, for example, the use of analog or one-direction-at-a-time reception beamforming at the WCD and indicates the reception beam sweep length. Of course, the beam sweeping property reported by the WCD may comprise more than one property, and the WCD may indicate further or other reception beamforming details and/or may indicate one or more transmission beamforming details.

Instead of strictly using analog beamforming or digital beamforming, the WCD may indicate that it uses a hybrid approach in which it uses analog beamforming for subranges within an overall angular range but applies digital processing to the samples acquired within each angular sub-range, for distinguishing different directions within the sub-range. The corresponding beam sweeping operation at the TRP can then be tailored to the hybrid beamforming capabilities of the WCD.

As another example, the beam sweeping property indicates the transmission beam sweep length and/or the number of transmit beams simultaneously transmitted by the WCD, and the node configures a reception beam sweep at a TRP in dependence on the reported property. Configuring the reception beam sweep at the TRP includes, for example, controlling resource reservation so that the number or amount of reception resources—in time and/or frequency—is tailored to the way the WCD performs directional transmission. The tailoring allows a reduction in the number or amount of resources reserved, at least in cases where the beamforming property of the WCD is better than some baseline or minimum-capability assumption that the node might otherwise use as a basis for configuring the reception beam sweep, i.e. in absence of reported property information.

The WCD may report a beam sweeping property for reception beamforming and may report a separate beam sweeping property for transmission beamforming. Alternatively, the WCD may report one or the other but not both, or it may send a composite property indicative of both reception and transmission beamforming features or capabilities of the WCD. Beam sweeping information sent by the WCD may convey the property or properties directly or indirectly, such as by conveying a value that maps to a particular property, or from which the property can be derived or deduced. As an example, the WCD sends an index value from a defined table of beam sweeping properties, and the network node uses the index value to read the corresponding beam sweeping property or properties from a copy of the table.

Figure 1:
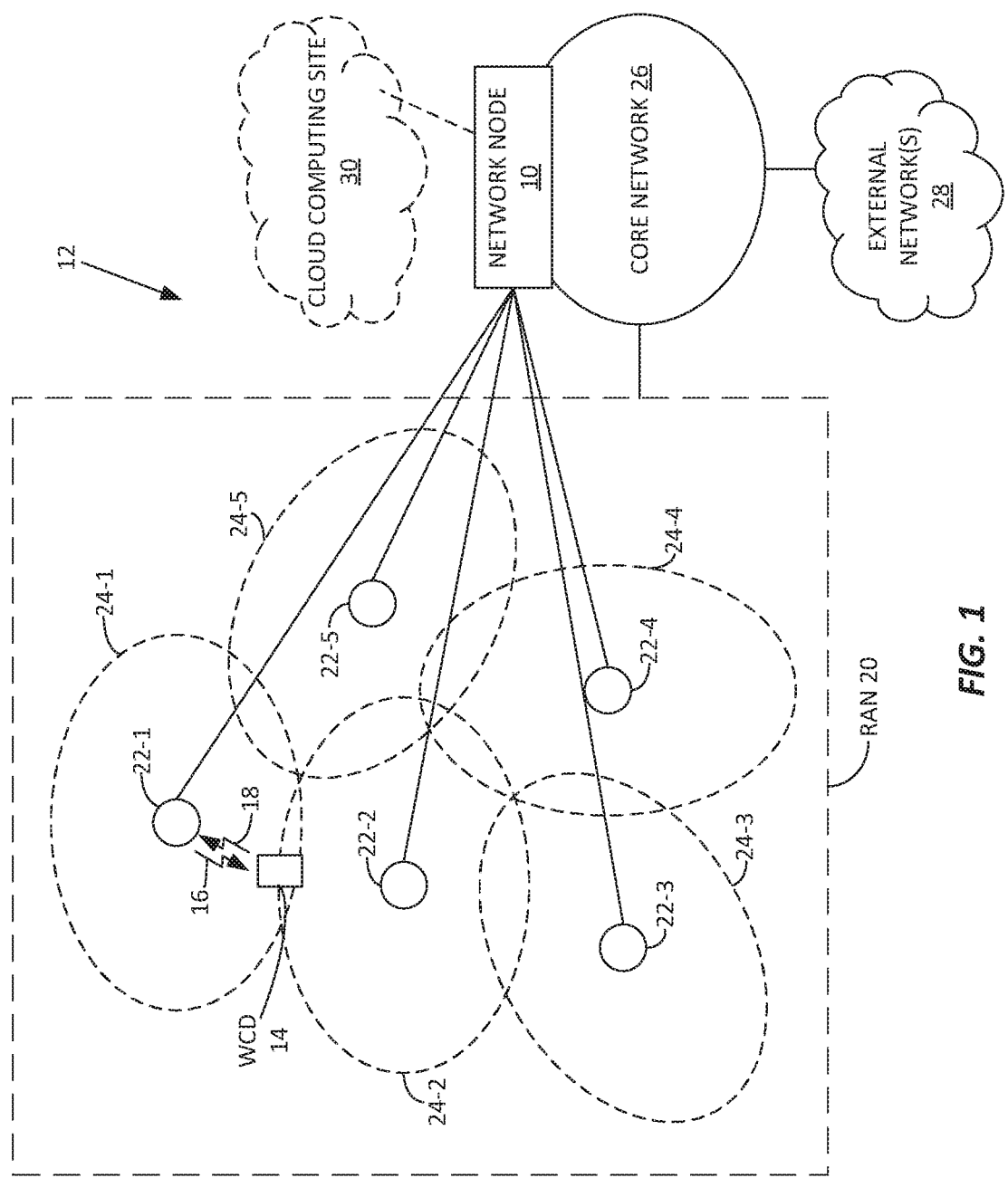
FIG. 1 is a block diagram of an example embodiment of a wireless communication network that includes a network node operative to configure beam sweeping operations at respective Transmission/Reception Points (TRPs).

FIG. 1 illustrates an example network node 10 that is configured for operation in a wireless communication network 12. The network 12 provides one or more types of communications services to wireless communication devices, with only one wireless communication device (WCD) 14 shown for simplicity of illustration. Communication between the WCD 14 and the network 12 involves downlink signals 16 transmitted by the network 12 and uplink signals 18 transmitted by the WCD 14. The network 12 includes a radio access network (RAN) 20 that includes one or more Transmission/Reception Points (TRPs) 22, with each TRP 22 providing radio service over one or more coverage areas 24.

In an example case, the coverage areas 24 are respective "cells" of the network 12, with each cell representing the allocation or use of particular communication resources over a particular geographic area, such as the allocation of a carrier frequency. General examples of communication resources include time resources, frequency resources, or code resources, or any combination of time, frequency and code resources. In other examples, the coverage areas 24 represent transmission or reception beams used by the respective TRPs 22, with the possibility that at least some of the coverage areas 24 are dynamic, such as where beam directions are steered or where different beams are activated at different times. Further, while the illustration may suggest the use of broad beams, a TRP 22 may use various sized or shapes of beams.

FIG. 1 depicts five TRPs 22, denoted as 22-1, 22-2, 22-3, 22-4, and 22-5. Five coverage areas 22 correspond to the respective TRPs 22 and are denoted as 24-1, 24-2, 24-3, 24-4, and 24-5. The foregoing values are only examples. The RAN 20 may have more TRPs 22 or fewer TRPs 22, and each TRP 22 may provide more than one coverage area 24. The RAN 20 operates as a Third Generation Partnership Project (3GPP) network, for example. In at least one embodiment, the RAN 20 operates as a New Radio (NR) or 5G access network in which each TRP 22 includes an antenna array operative for transmission and/or reception beamforming.

A core network (CN) 26 provides an interface to one or more external networks 28, such as the Internet. The CN 26 and/or the RAN 20 also may connect with one or more cloud computing sites 30 that provide centralized processing or data resources used in one or more aspects of network operation. For example, all or part of the functionality attributed to the network node 10 described herein may be implemented at a cloud computing site 30.

In the context of FIG. 1, the WCD 14 is configured for operation in the network 12, i.e., it is configured to connect with and communicate with TRPs 22 in the network 12 according to the air interface and protocols implemented by the network 12. In one aspect of its communications with the network 12, the WCD 14 reports a beam sweeping property or properties, relating to how the WCD 14 performs directional reception and/or transmission. Correspondingly, the network node 10 is operative to configure directional transmission and/or reception at one or more TRPs 22 with respect to the WCD 14, based on the reported beam sweeping property.

A centralized position characterizes the network node 10 of FIG. 1, wherein the network node 10 has responsibility for multiple TRPs 22. Although the diagram depicts lines of communication directly between the network node 10 and the respective TRPs 22, the network node 10 may communicate with the respective TRPs 22 using signaling paths associated with other logical connections, such as between the RAN 20 and mobility, access, or authentication entities in the core network 26, which are not shown here for simplicity. The network node 10 may also be a node related to access and mobility control and/or authentication control, such as an Access and Mobility management Function (AMF) as specified in the 3GPP standard for a 5G core network, e.g. 5GC. The network node 10 may also be a core network User Plane Function (UPF) as specified in the 3GPP standard for a 5G core network, e.g. 5GC, or a node fulfilling the functions of both an AMF and a UPF. Yet another possibility is that the network node 10 is an entity fulfilling all or a subset of the functions of an AMF, a UPF and a Session Management Function (SMF), where the SMF conforms with the 3GPP specifications of such a function in the specifications for a 5G core network, e.g. 5GC.

FIG. 2 illustrates another embodiment where a respective network node 10 is implemented in each of the TRPs 22, e.g., the TRP 22-1 includes a network node 10-1 and the TRP 22-2 includes a network node 10-2, and so on. One view of the arrangement of FIG. 2 is that the respective network nodes 10 are co-located with the respective TRPs 22. In another understanding, each TRP 22 implements the functionality of the network node 10, e.g., using the processing and communication circuitry included in the TRP 22. Consequently, unless stipulated or clear from the context, the term "network node 10" may connote a standalone node within the network 12 or may connote functionality integrated into another node, such as a TRP 22.

Moreover, the term TRP 22 broadly covers, unless stipulated or clear from the context, a broad range of node types. For example, the TRPs 22 may be radio base stations, referred to as eNBs according to the terminology used for networks based on Long Term Evolution (LTE) specifications, or referred to as gNBs in the NR context. Further possibilities include the implementation of TRPs 22 as points in a distributed antenna system (DAS), or as remote radio units (RRUs) associated with one or more controlling digital radio units (DRUs). 5G specifications contemplate a split in the radio processing chain, in which a gNB—a 5G base station—includes a Central Unit (CU) and one or more Distributed Units (DUs). In such a scenario, the functionality of the contemplated network node 10 may be implemented in the DU portion of a gNB, and provide beam sweep configuration control for each of the CUs controlled by the DU.

Figure 3:
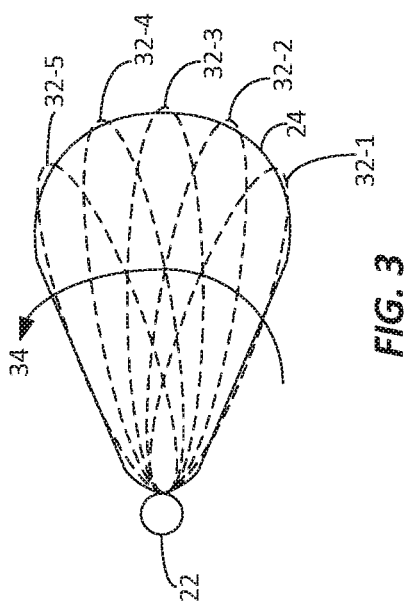
FIG. 3 is a diagram of an example reception or transmission beam sweeping configuration at a TRP.

FIG. 3 illustrates an example "beam sweep" 34 as performed by a TRP 22, for reception beamforming or transmission beamforming. The TRP 22 uses a number of directional beams 32 to span a certain angular range, which by default or for the transmission of network discovery signals may be the angular range corresponding to the coverage area 24. The angular range may be a range in one or two dimensions. In the latter case the compound angular range is thus a solid angle (expressed in steradians, where one steradian corresponds to one unit of area on the unit sphere surrounding the TRP's antenna(s)). The term "beam sweep" denotes the fact the angular range is divided into multiple directional beams. How long the beam sweep takes, and the resources needed for it depends on the number of beams and the duration or dwell time of each beam and the time gap, if any, between each two beams. Here, the term "resource" denotes time resources, or frequency resources, or code/ID resources (e.g., beam identifiers or beam-specific sequences), or any combination thereof.

In an example resource usage at a TRP 22, the TRP 22 may control the dwell time of each of its transmit beams—i.e., how long each beam is kept constant—in dependence on reception beam sweeping at the WCD 14. Particularly, assuming that the WCD 14 receives one beam at a time, the TRP 22 maintains each beam for the duration of a beam sweep at the WCD 14. That is, the dwell time for each transmit beam direction at the WCD 14 equals the time corresponding to one beam sweep length at the WCD 14. Alternatively, beam "dwell time" may be understood as the time during which each reception beam remains constant, to observe a corresponding transmission beam sweep. In this latter case, the dwell time depends on the number of transmit beams included in the transmit beam sweep.

Of particular interest herein is the reception beam sweep on the WCD side. The dwell time of each receive beam in the WCD 14 would typically be one Transmission Time Interval (TTI), which may span or be defined by a set of OFDM symbols. On the TRP side, still in the context of a reception beam sweep at the WCD 14, the TRP 22 transmits in each beam direction a number of times in a row that is equal to the number of reception beams included in the beam sweep being used by the WCD 14. For example, for N reception beams in the reception beam sweep at the WCD 14, the TRP 22 performs N consecutive transmissions in each transmission beam direction. The transmission repetitions at the TRP 22 can be viewed as keeping the beam direction unchanged for the time required to transmit N times and, in turn, that time could be seen as the dwell time of each transmission beam at the TRP side.

A TRP 22 uses transmission beam sweeping, for example, to transmit certain reference signals, such as downlink synchronization signals, Cell Reference Signals (CRS) such as Channel State Information Reference Signals (CSI-RS), mobility reference signals, which may be beam-specific, or the like. A TRP 22 uses reception beam sweeping, for example, to search for uplink reference signals from a WCD 14.

Figure 4:
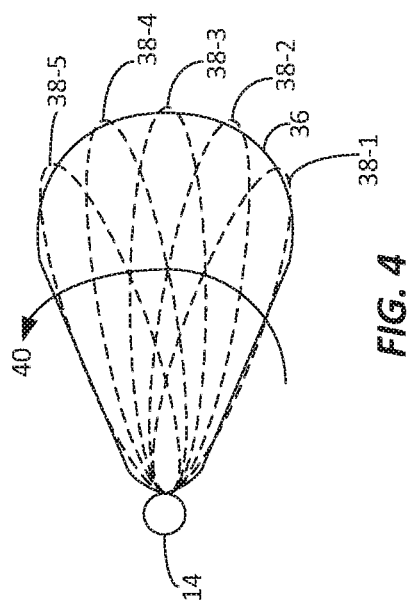
FIG. 4 is a diagram of an example reception or transmission beam sweeping configuration at a wireless communication device (WCD).

FIG. 4 illustrates an example beam sweep 40 at the WCD 14. In a reception example, the WCD 14 uses reception beam sweeping to make mobility measurements—e.g., perform cell or beam searching—to identify candidate cells or beams for communicating with the network 12. More broadly, the WCD 14 may use reception beam sweeping to search for any one or more types of downlink reference signals or other downlink transmissions. The timewise length of a reception beam sweep—the sweep length—depends on the number of beams 38 used to span the angular range 36, and the duration or dwell time of each beam and the time gap, if any, between each two beams. The angular range 36 may be a default range or a reduced range, depending, for example, whether the WCD 14 has information about which directions should be included or excluded.

In a transmission example, the WCD 14 uses transmission beam sweeping to transmit uplink reference signals. Transmitting uplink reference signals in multiple directions allows the network 12 to identify favorable beam directions for communicating with the WCD 14 from one or more TRPs 22.

Figure 5:
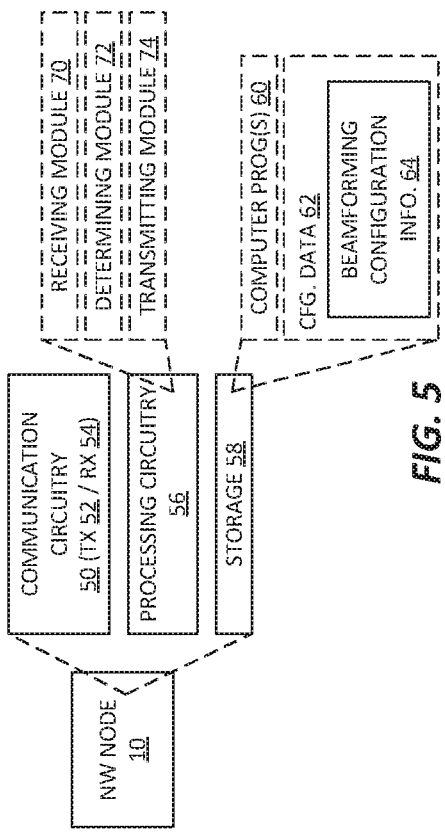
FIG. 5 is a block diagram of an example embodiment of the network node depicted in FIG. 1 or 2.

FIG. 5 depicts example details for the network node 10, with the network node 10 comprising communication circuitry 50. The communication circuitry 50 includes, for example, the physical-layer interface circuitry, which may be configured for wired and/or wireless communication, including corresponding transmitter circuitry 52 and receiver circuitry 54. In implementations where the network node 10 comprises a functional implementation within a TRP 22, the communication circuitry 50 may comprise the radiofrequency communication circuitry used by the TRP 22 for transmitting to and/or receiving from WCDs 14. In implementations where the network node 10 is separate from a TRP 22, the communication circuitry 50 may comprise wired or wireless interface circuitry configured for communicating directly or indirectly with one or more TRPs 22, which in turn communicate with respective WCDs 14.

Further example components of the network node 10 include processing circuitry 56 that is operatively associated with the communication circuitry 50—i.e., control or data signaling into and out of the processing circuitry 56 may flow through the communication circuitry 50. Example implementations of the processing circuitry 56 include the use of dedicated or fixed circuits or the use of programmatically configured circuits or the combined use of fixed and programmed circuitry. As such, the processing circuitry 56 may comprise one or more microprocessors, digital signal processors (DSPs), field programmable gate arrays (FPGAs), application specific integrated circuits (ASICs), or other arrangements of digital processing circuitry that are realized according to the execution of stored computer program instructions in the form of stored software or firmware.

Correspondingly, an example implementation of the network node 10 includes storage 58 that comprises one or more types of computer-readable storage media. The storage 58 provides, for example, volatile memory for use in the live operation of the network node 10 and non-volatile memory for longer-term storage of one or more computer programs 60 and one or more items of configuration data 62, such as beamforming configuration information 64. In instances where the processing circuitry 56 is based on general-purpose CPUs or other general-purpose circuitry, such general-purpose circuitry is specially adapted to carry out the operations detailed herein, based on the execution of computer program instructions included in the one or more stored computer programs 60.

With the above in mind, the communication circuitry 50 is configured for wireless communication with WCDs 14 or configured for inter-nodal communication with another network node 10, 22 in the network 12 that is configured for wireless communication with WCDs 14. The processing circuitry 56 is operatively associated with the communication circuitry 50 and configured to: receive beam sweeping information from a WCD 14. The received information indicates a beam sweeping property of the WCD 14 with respect to performing directional reception or transmission and the processing circuitry 56 is configured to determine a beam sweep configuration to be used by a TRP 22 in the network 12 with respect to the WCD 14, in dependence on the beam sweeping property.

In one or more embodiments, the TRP 22 that receives the beam sweeping information is not necessarily the TRP 22 involved in the beam sweeping adaptations, or at least it may not be the only TRP 22 involved. For example, after receiving the beam sweeping information once from the WCD 14, the information can be propagated elsewhere in the network 12, to be provided to any given TRP 22 when needed. For example, the information may be provided to a TRP 22 that neighbors another TRP 22 currently serving the WCD 14, and the neighboring TRP 22 may modify how it beam sweeps downlink reference signals transmitted by it as a basis for its evaluation by the WCD 14 in a handover context.

In one example, the beam sweeping property relates to the ability of the WCD 14 to perform directional reception or transmission in more than one direction simultaneously. Correspondingly, the processing circuitry 56 is configured to determine the beam sweep configuration to be used by the TRP 22 in the network 12 with respect to the device 14 by determining a Frequency Division Multiplexing (FDM) dimension and a Time Division Multiplexing (TDM) dimension for the TRP 22 to use when performing a transmission or reception beam sweep with respect to the WCD 14. The TDM dimension refers to the number of different beam transmission instances and/or beam repetitions used in time while the FDM dimension refers to the number of beam frequency locations used. The processing circuitry 56 in at least one such embodiment is configured to allocate radio resources in frequency and time for the transmission or reception beam sweep, in dependence on the FDM and TDM dimensions.

Consider an example case where the beam sweeping property reported by the WCD 14 indicates either that the WCD 14 uses analog beamforming for directional reception or uses digital beamforming for directional reception. Correspondingly, the processing circuitry 56 is configured to configure the beam sweep configuration used by a TRP 22 for transmission with respect to the WCD 14 in accordance with the indicated use of analog or digital beamforming by the WCD 14. In particular, the processing circuitry 56 is configured whether or to what extent to use beam repetition in the transmission beam sweep.

When the beam sweeping property indicates the use of analog beamforming by the WCD 14 for directional reception, the processing circuitry 56 configures the transmit beam sweep configuration of the TRP 22 to use beam repetition. Conversely, when the beam sweeping property indicates the use of digital beamforming by the WCD 14 for directional reception, the processing circuitry 56 configures the transmit beam sweep configuration of the TRP 22 without beam repetition. The beam sweeping property may be a value representing the number of reception beam directions used by the WCD 14, and the processing circuitry 56 may be configured to interpret that value as an indication that the WCD 14 scans those beams one at a time. Alternatively, the beam sweeping property is a flag or other indicator, indicating the use of analog or digital beamforming, and the beam sweeping information sent from the WCD 14 further indicates the number of beams to be used by the WCD 14 for directional reception, at least in the case that the WCD 14 uses analog beamforming for directional reception.

In a particular example, based on knowing the number of beam directions scanned by the WCD 14 one at a time for directional reception, the processing circuitry 56 configures a transmission beam sweep at the TRP 22 to use a beam repetition that is at least equal to the number of individual beam directions used by the WCD 14. For directional transmission by the TRP 22, the term "beam repetition" refers to the number of times that the subject signal is transmitted in each beam direction. Assuming that each instance of signal transmission has a defined duration, repeating that transmission in the same direction increases the overall beam sweep length of the directional transmission in proportion to the repetition factor. Thus, the processing circuitry 56 may be configured to set the beam repetition factor used in a transmission beam sweep by a TRP 22 with respect to the WCD 14, in dependence on the number of receive beams used by the WCD 14 and whether or to what extent the WCD 14 supports simultaneous receive beams.

The beam sweeping property in one or more embodiments indicates how many transmit beam directions are used by the WCD 14 simultaneously, or how many beam directions the WCD transmits in one after the other (e.g. sequentially) for performing a transmission beam sweep. The processing circuitry 56 is configured to determine whether or to what extent to use beam repetition when performing a reception beam sweep at the TRP 22 for the WCD 14, in dependence on the number of transmit beam directions simultaneously used by the WCD 14. "Beam repetition" in the case of a reception beam sweep by the TRP 22 denotes one or more repetitions of received-signal monitoring by the TRP 22 in each beam direction. Repetition may be performed by keeping the reception beam unchanged for a time equal to the time of a complete transmission beam sweep at the WCD 14 or it may be performed in the form of repeated complete reception beam sweeps, in case the WCD 14, during its transmission beam sweep, repeats each beam direction a number of times equal to the number of reception beams used at the TRP.

For example, the TRP 22 monitors in each receive beam direction over a window equal to the time it takes the WCD 14 to perform directional transmission over its entire set of transmit beams. Thus, the monitoring time can be shortened to the extent that the WCD 14 transmits in more than one direction simultaneously. Thus, the processing circuitry 56 can tailor the reservation of time and/or frequency resources for performance of the reception beam sweep by the TRP 22, in dependence on whether or to what extent the WCD 14 transmits in more than one direction simultaneously and/or in dependence on the number of transmit beam directions used by the WCD 14.

In a general or representative example, the beam sweeping property reported by the WCD 14 is a beam sweep length, the beam sweep length being the number of time intervals required by the WCD 14 to perform a reception beam sweep or a transmission beam sweep over an angular range, e.g. expressed as the number of beam directions included in the beam sweep. Correspondingly, the processing circuitry 56 is configured to determine the beam sweep configuration to be used by the TRP 22 in the network 12 with respect to the WCD 14 by configuring the TRP 22 to use a reception or transmission window length, e.g., in the form of a number repetitions, for each of its reception or transmission beam configurations, respectively, that matches the beam sweep length of the WCD 14, or is supported by the WCD 14, as determined from the beam sweep length of the WCD 14.

As suggested by the details in FIG. 5, the network node 10 in one or more embodiments, may be understood as comprising a number of processing units or modules, with the individual modules being realized according to the execution of computer program instructions via the processing circuitry 56. An example module set includes a determining module 70 that is configured to receive beam sweeping information from a WCD 14, indicating a beam sweeping property of the WCD 14 with respect to performing directional reception or transmission, and a determining module 72 that is configured to determine a beam sweep configuration to be used by a TRP 22 in the network 12 with respect to the WCD 14, in dependence on the beam sweeping property. Further, at least in cases where the network node 10 is not instantiated in the TRP 22 being configured, a transmitting module 74 may be included, where the transmitting module 74 is configured to communicate the beam-sweep configuration information to the TRP 22.

Figure 6:
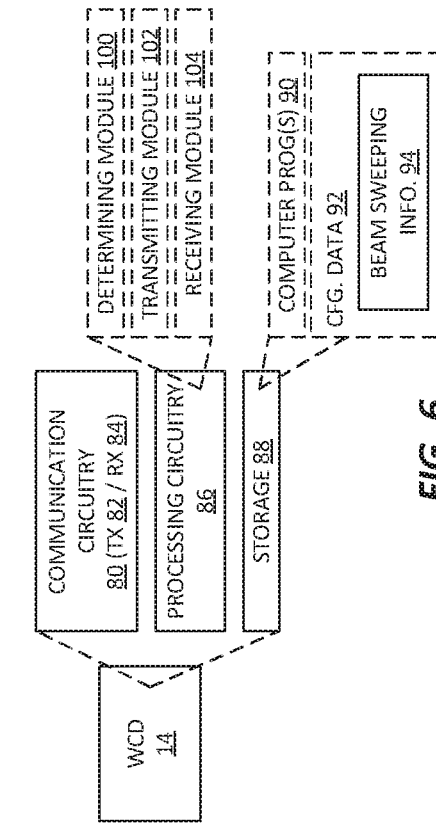
FIG. 6 is a block diagram of an example embodiment of the WCD depicted in FIG. 1.

FIG. 6 illustrates an example embodiment of the WCD 14, which may be a "User Equipment" (UE) according to the vernacular of the 3GGP, although a UE may or may not have a human user, depending on its design and intended use. Thus, while smartphones, tablets, and other personal computing devices are representative examples of UEs, so too are the wide range of Machine Type Communication (MTC) devices of increasing prevalence in industrial and commercial monitoring and control applications, e.g., in the Internet-of-Things (IoT) context. Therefore, the term "WCD" as used herein denotes any wireless communication apparatus that is configured for operation with the network 12, and does not imply limitations on the feature set, intended use, or manner of use, subject to the qualification that a WCD 14 as contemplated herein sends beam sweeping information suitable for use by the network 12 in configuring beam sweeping operations by one or more TRPs 22 in the network, as described herein.

The example WCD 14 includes communication circuitry 80 configured for wireless communication with TRPs 22 in the network 12. The communication circuitry 80 may support more than one Radio Access Technology (RAT) so that it can communicate with RANs of different types. In an example case, the communication circuitry 80 supports the frequencies, protocols, and timing of both 4G and 5G RANs. Additionally, the communication circuitry 80 may support one or more Wireless Local Area Network (WLAN) standards, such as defined by the 802.11 family of specifications. With such options in mind, the communication circuitry 80 at least includes transmitter circuitry 82 and receiver circuitry 84 that is configured for wireless communication with TRPs 22 in the RAN 20.

Further included in the WCD 14 is processing circuitry 86 that is operatively associated with the communication circuitry 80 and configured to determine a beam sweeping property of the WCD 14 with respect to the WCD 14 performing directional reception or transmission, and transmit beam sweeping information indicating the beam sweeping property, for use by a network node 10 in the network 12, in configuring a beam sweep to be used by a TRP 22, with respect to the WCD 14 performing the directional reception or transmission. The beam sweeping property may be a fixed or static property, or it may vary in dependence on the operating mode of the WCD 14, or on one or more of the prevailing operating conditions of the WCD 14. Example conditions include radio-link path losses, remaining battery life at the WCD 14, etc. And, as noted, the term "beam sweeping property" is inclusive in the sense that only one or more than one property may be reported by the WCD 14 as the "beam sweeping property." Further, the word "property" takes on its ordinary and customary meaning as applied to "beam sweeping," denoting one or more attributes, qualities, features, or characteristics of transmission and/or reception beam sweeping by the WCD 14.

In an example case, the beam sweeping property comprises a beam sweep length to be used by the WCD 14 with respect to the WCD 14 performing the directional reception or transmission. The processing circuitry 86 in this case is configured to operate the WCD 14 with the determined beam sweep length, unless the WCD 14 receives signaling from the network 12 that overrides the determined beam sweep length, in which case the processing circuitry 86 operates the WCD 14 with a selected beam sweep length indicated in the signaling received from the network 12. The override length changes the beam sweep length reported by the WCD 14 to the selected length indicated by the network 12 in the return signaling to the WCD 14. The beam sweep length selected by the network 12 remains compatible with the capabilities of the WCD 14. For example, the selected beam sweep length indicated by the network 12 may be longer than the beam sweep length reported by the WCD 14 as the beam sweeping property.

The purpose of such an overriding instruction from the network 12 to the WCD 14 may be to make the WCD 14 cover the angular range of the beam sweep with narrower beams, for example. Narrower beams achieve greater beam gain by greater concentration of the transmit power, in the case of a transmission beam sweep, or increasing the reception sensitivity, in case of a reception beam sweep. Another purpose could be to increase the angular range of the beam sweep, e.g., without changing the width of each beam. The overriding beam sweep length may also be shorter than the determined beam sweep length, if the purpose is to reduce the angular range of the beam sweep, e.g., by skipping one or more beam(s) on the edge(s) of the beam sweep or skipping beams in particular direction(s), such as up and/or down.

In the same or in another example, the beam sweeping property relates to the type of reception beamforming used by the WCD 14, the type being one of RF beamforming, also known as analog beamforming, or baseband beamforming, also known as digital beamforming. A further possibility is that the WCD 14 uses a hybrid of digital and analog beamforming and indicates its hybrid capabilities via the beam sweep property reported to the network 12. In one example, the beam sweeping property indicates the number of beams used by the WCD for directional transmission and/or reception, or such information is further included in the beam sweeping information sent by the WCD 14.

As a particular example, the processing circuitry 86 may be configured to indicate, in the beam sweeping information, the number of reception beams used by the WCD 14 for performing a reception beam sweep over an angular range—i.e., the reception beam sweep length to be used by the WCD 14. Additionally, or alternatively, the beam sweeping property is at least one of, the number of transmit beams used by the WCD 14 for performing a transmission beam sweep over an angular range—i.e., the transmission beam sweep length to be used by the WCD 14; and the number of transmit beams that the WCD 14 can transmit simultaneously.

Further in one or more embodiments, the processing circuitry 86 is configured to perform at least one of the following: transmitting the beam sweeping information during a registration procedure between the WCD 14 and the network 12, transmitting the beam sweeping information during a beam or cell handover procedure between the WCD 14 and the network 12, or transmitting the beam sweeping information responsive to receiving a request from the network 12. Specifications for 5G networks effectively merge the attachment and tracking area update procedures used in 4G LTE networks into a "registration" procedure and the WCD 14 may be configured to send its beam sweeping information when performing the 5G registration procedure.

The processing circuitry 86 may be configured to send the beam sweeping information during such registrations or in other procedures or responsive to other triggering events. For example, in one or more embodiments, the processing circuitry 86 is configured to transmit updated beam sweeping information, responsive to a change in the beam sweeping property of the WCD 14. As noted, the beam sweeping property may vary depending on the operating mode or conditions of the WCD 14.

Example implementations of the processing circuitry 86 include the use of dedicated or fixed circuits or the use of programmatically configured circuits or the combined use of fixed and programmed circuitry. As such, the processing circuitry 86 may comprise one or more microprocessors, digital signal processors (DSPs), field programmable gate arrays (FPGAs), application specific integrated circuits (ASICs), or other arrangements of digital processing circuitry configured according to the execution of stored computer program instructions in the form of stored software or firmware.

Correspondingly, an example implementation of the WCD 14 includes storage 88 that comprises one or more types of computer-readable storage media. The storage 88 provides, for example, volatile memory for use in the live operation of the WCD 14 and non-volatile memory for longer-term storage of one or more computer programs 90 and one or more items of configuration data 92, such as beam sweeping information 94. In instances where the processing circuitry 86 is based on general-purpose CPUs or other general-purpose circuitry, such general-purpose circuitry is specially adapted to carry out the operations detailed herein, based on the execution of computer program instructions from the one or more computer programs 90.

As suggested by the details in FIG. 6, the WCD 14 in one or more embodiments, may be understood as comprising a number of processing units or modules, with the individual modules being realized according to the execution of computer program instructions via the processing circuitry 86. An example module set includes a determining module 100 that is configured to determine a beam sweeping property of the WCD 14 with respect to the WCD 14 performing directional reception or transmission, and a transmitting module 102 that is configured to transmit beam sweeping information indicating the beam sweeping property, for use by a network node 10 in configuring a beam sweep to be used by a TRP 22, with respect to the WCD 14 performing the directional reception or transmission. The WCD 14 may also include a receiving module 104 that is configured for receiving related return signaling from the network 12, such as signaling indicating a selected beam sweep length to be used by the WCD 14.

Figure 7:
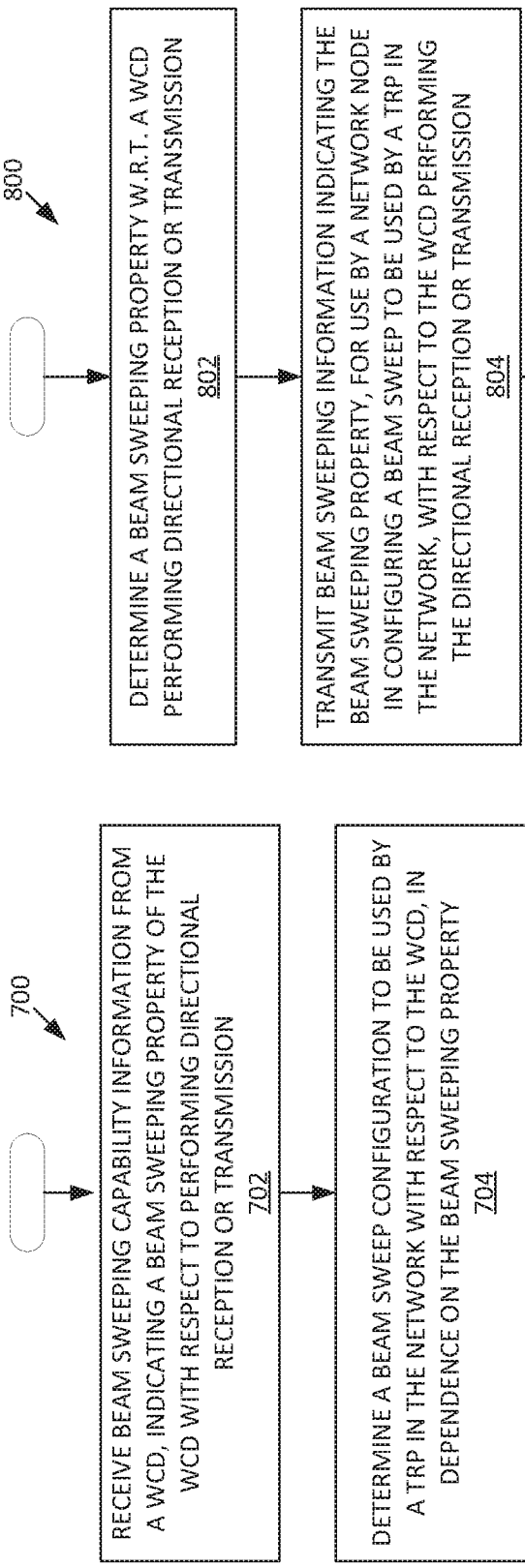
FIG. 7 is a logic flow diagram of an example embodiment of a method of operation at a network node.

FIG. 7 illustrates a method 700 of operation by a network node 10 in a wireless communication network 12. A network node 10 configured according to the example of FIG. 5 may perform the method 700, e.g., based on the execution of computer program instructions stored in the storage 58. However, performance of the method 700 is not limited to the depicted example of the network node 10. Further, the method 700 may be performed in an order other than that suggested by the illustration or may be repeated or performed in parallel for respective WCDs 14 or in conjunction with receiving updated beam sweeping information from one or more WCDs 14. The method 700 also may be performed in conjunction with other ongoing processing at the network node 10.

The method 700 includes the network node 10 receiving (Block 702) beam sweeping information from a WCD 14, indicating a beam sweeping property of the WCD 14 with respect to performing directional reception or transmission, and determining (Block 704) a beam sweep configuration to be used by a TRP 22 in the network 12 with respect to the WCD 14, in dependence on the beam sweeping property.

In an example, the beam sweeping property relates to the ability of the WCD 14 to perform directional reception or transmission in more than one direction simultaneously. For example, the WCD 14 indicates that it uses analog beamforming or that it otherwise receives in one direction at a time, and indicates its beam sweep length, which may be a default value to be used by the WCD 14 in the absence of any overriding information from the network 12. In a similar example, the WCD 14 simply indicates its reception beam sweep length and that indication serves as an implicit indication to the network 12 that the WCD 14 can receive in only one direction at a time.

In one or more embodiments, determining (Block 704) the beam sweep configuration to be used by the TRP 22 with respect to the WCD 14 comprises determining an FDM dimension and a TDM dimension for the TRP 22 to use when performing a transmission or reception beam sweep with respect to the WCD 14. The method 700 may further include the network node 10 allocating radio resources in frequency and time for the transmission or reception beam sweep to be performed by the TRP 22, in dependence on the FDM and TDM dimensions.

As another example, the beam sweeping property depends on whether the WCD 14 uses RF or baseband beamforming for reception. Determining (Block 704) the beam sweep configuration comprises determining whether or to what extent to use beam repetition when performing a transmission beam sweep for the WCD 14. Such operations may entail, in response to the beam sweeping property indicating that the WCD 14 uses RF beamforming for reception, configuring the transmission beam sweep at the TRP 22 to use beam repetition. Where the beam sweeping information indicates the number of reception beams used by the WCD 14 to span an angular range, the method 700 may further include configuring the number of beam repetitions used in the transmission beam sweep at the TRP 22 in dependence on the number of reception beams used by the WCD 14.

In response to the beam sweeping property indicating that the WCD 14 uses baseband beamforming for reception, determining whether or to what extent to use beam repetition when performing the transmission beam sweep for the WCD 14 comprises configuring the transmission beam sweep without the use of beam repetition. That is, if the beam sweeping property indicates that the WCD 14 can receive in all of its reception directions simultaneously, the network node 10 saves resources by configuring the TRP 22 not to use beam repetition when it performs a transmission beam sweep with respect to the WCD 14.

In a further example, the beam sweeping property indicates how many transmit beam directions are used by the WCD 14 simultaneously for performing a transmission beam sweep. Determining (Block 704) the beam sweep configuration comprises determining whether or to what extent to use beam repetition when performing a reception beam sweep with respect to the WCD 14, in dependence on the number of transmit beam directions simultaneously used by the WCD 14.

In an overall or general example, the beam sweeping property is a beam sweep length, which the network 12 can translate into the number of time intervals required by the WCD 14 to perform a reception beam sweep or a transmission beam sweep over an angular range. Determining (Block 704) the beam sweep configuration to be used by the TRP 22 with respect to the WCD 14 comprises configuring the TRP 22 to use a reception or transmission window length that matches the beam sweep length, or is supported by the WCD 14, as determined from the beam sweep length.

Figure 8:
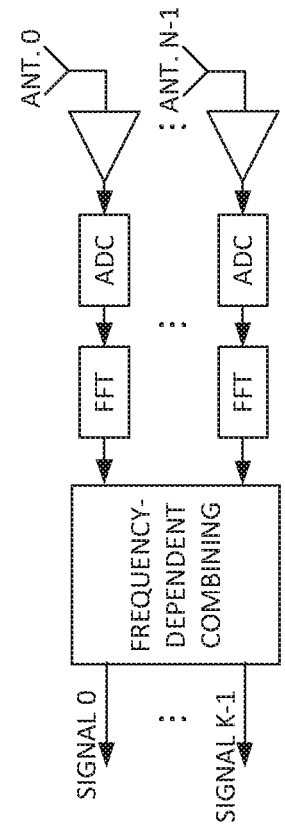
FIG. 8 is a logic flow diagram of an example embodiment of a method of operation at a WCD.

FIG. 8 illustrates a method 800 of operation by a WCD 14 in a wireless communication network 12. A WCD 14 configured according to the example of FIG. 6 may perform the method 800, e.g., based on the execution of computer program instructions stored in the storage 88. However, the performance of the method 800 is not limited to the depicted example of the WCD 14. Further, the method 800 may be performed in an order other than that suggested by the illustration or may be repeated or performed along with other, ongoing processing in the WCD 14.

The method 800 includes the WCD 14 determining (Block 802) a beam sweeping property of the WCD 14 with respect to the WCD 14 performing directional reception or transmission and transmitting (Block 804) beam sweeping information indicating the beam sweeping property, for use by a network node 10 in configuring a beam sweep to be used by a TRP 22 in the network 12, with respect to the WCD 14 performing the directional reception or transmission.

In an example embodiment, the beam sweeping property is a beam sweep length, e.g., expressed as a number of beams or beam directions in a beam sweep, to be used by the WCD 14 with respect to the WCD 14 performing the directional reception or transmission. Correspondingly, the method 800 further comprises operating with the determined beam sweep length, unless the WCD 14 receives signaling from the network 12 that overrides the determined beam sweep length, in which case the method 800 includes operating with the sweep length configured by the network 12. The overriding beam sweep length, e.g. in terms of number of beams or beam directions in a sweep, will be, according to its determination by the network 12, compatible with the capabilities of the WCD 14. For example, the overriding beam sweep length indicated by the network 12 may be longer than the beam sweep length reported by the WCD 14 as the beam sweeping property. i.e. the determined beam sweep length.

As another example, the beam sweeping property indicates the type of reception beamforming used by the WCD 14, the type being one of radiofrequency (RF) beamforming or baseband beamforming. In an extension of the example, or as another example, the method 800 includes indicating, in the beam sweeping information, the number of reception beams used by the WCD 14 for performing a reception beam sweep over an angular range.

In the context of directional transmission by the WCD 14, the beam sweeping property in an example embodiment is at least one of: the transmit beam sweep length; and the number of transmit beams that the WCD 14 can transmit simultaneously.

The method 800 may include, as the transmitting step of block 804: transmitting the beam sweeping information during a registration procedure between the WCD 14 and the network 12 and/or transmitting the beam sweeping information during, or in preparation for, a beam or cell handover procedure between the WCD 14 and the network 12 and/or transmitting the beam sweeping information responsive to receiving a request from the network 12. As a further aspect, the method 800, the transmitting step of Block 804 may comprise transmitting updated beam sweeping information responsive to a change in the beam sweeping property of the WCD 14.

With the above examples of node and device operations in mind, a WCD 14 and a network node 10 that are respectively configured according to any of the above example embodiments together form a wireless communication system, in which the beam sweeping configuration of a TRP 22 for transmitting to or receiving from the WCD 14 is adapted or otherwise adjusted, in dependence on one or more beam sweeping properties of the WCD 14. In operation, the WCD 14 sends beam sweeping information indicating a beamforming property of the WCD 14, and the network node 10 configures reception or transmission beamforming at a TRP 22, for performing a reception beam sweep or a transmission beam sweep at the TRP 22, for the WCD 14.

Figure 9:
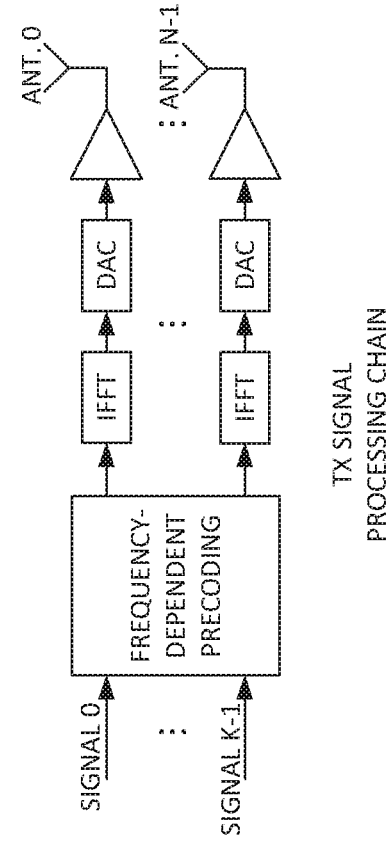
FIG. 9 is a block diagram of an example embodiment of communication circuitry at a WCD that is configured for baseband transmission and reception beamforming, also referred to as digital beamforming.

Example beam sweeping properties depend on whether the WCD 14 uses analog or digital beamforming, with the left portion of FIG. 9 illustrating transmitter circuitry configured for digital beamforming for directional transmission by the WCD 14 and the right portion illustrating receiving circuitry configured for directional reception by the WCD 14. For transmission, the example transmit signal chain in the WCD 14 includes frequency-dependent precoding of signals 0 through K−1, along with the application of an Inverse Fast Fourier Transform (IFFT) to the respective signals after precoding, followed by a Digital-to-Analog Conversion (DAC) and power amplification for transmission via a respective one of the antennas or antenna elements in the antenna array of the WCD 14. For reception, the example receive signal chain in the WCD 14 includes Analog-to-Digital Conversion (ACD) for each of the antenna-received signals, followed by application of a Fast Fourier Transform (FFT) to each of the digitized per-antenna signals, which is then followed by frequency-dependent combining to recover respective signals 0 through K−1.

Figure 10:
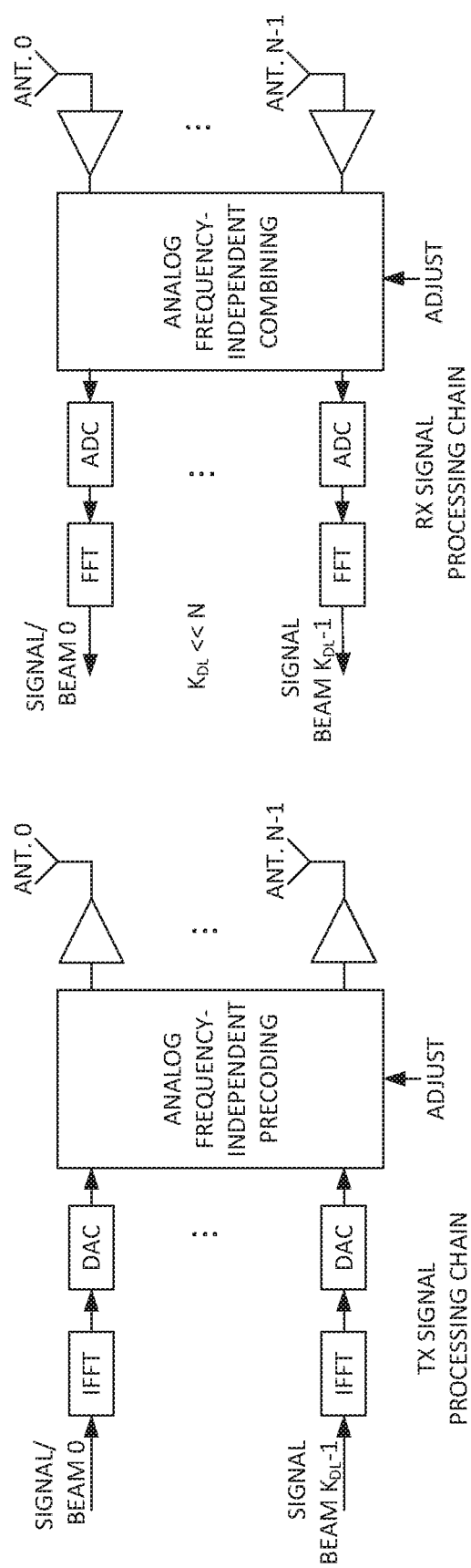
FIG. 10 is a block diagram of an example embodiment of communication circuitry at a WCD that is configured for radio frequency (RF) transmission and reception beamforming, also referred to as analog beamforming.

A notable property of digital beamforming for transmission or reception is that multiple beams may be used simultaneously, because the beamforming (precoding or combining) happens in the baseband, rather than in the analog domain at RF, such as is depicted in FIG. 10. The left side of FIG. 10 illustrates an example transmit signal chain for the WCD 14 in an analog beamforming implementation while the right portion depicts an example receive signal chain for the WCD 14 in an analog beamforming implementation. For transmission, the signals to be transmitted undergo IFFT processing, DAC, and are then fed into a frequency-independent analog precoder, which then feeds into the power amplifiers associated with the respective transmit antennas or antenna elements of the WCD 14. Essentially the inverse occurs in the example receive signal chain shown on the right, where the antenna-received signals undergo analog combining for directional reception, and the corresponding output signals are then digitized for FFT processing. The analog combining here involves applying per-antenna-element weights, resulting in desired spatial properties for the antenna array.

Figure 11:
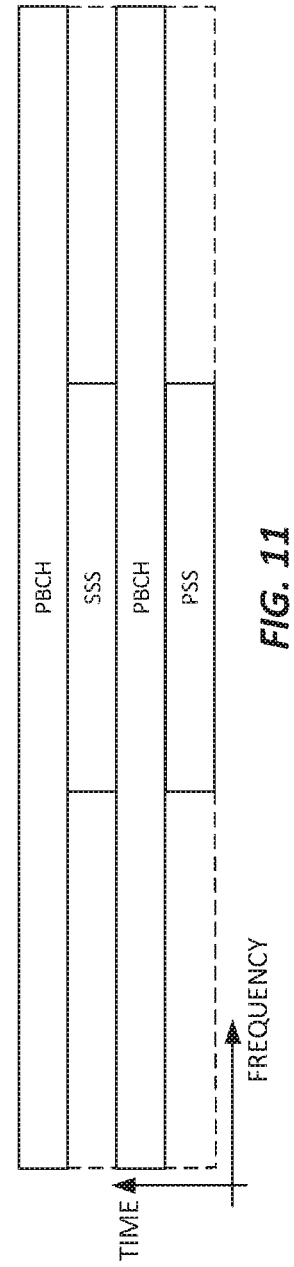
FIG. 11 is a diagram of a Synchronization Signal Block (SSB) in an example case, such as may be directionally transmitted by a TRP, for detection by a WCD.

FIG. 11 illustrates a Synchronization Signal Block (SSB), as might be transmitted by a TRP 22 in an NR-based configuration. The SSB has dimensions in time and frequency and includes Physical Broadcast Channels (PBCHs) along with a Primary Synchronization Signal (PSS) and a Secondary Synchronization Signal (SSS). The PSS/SSS enable a WCD 14 to synchronize with the TRP 22 that transmits the SSB, and thereby obtain the PBCHs, which in turn allow the WCD 14 to receive "system information" regarding the resources to use for system access, etc.

In at least one example related to SSB transmission, SSBs are used as Radio Resource Management (RRM) objects by one or more WCDs 14. Correspondingly, one or more TRPs 22 in the network 12 configure their respective beam sweeping for SSB transmissions in accordance with the beam sweep property reported by the WCD(s) 14.

Figure 12:
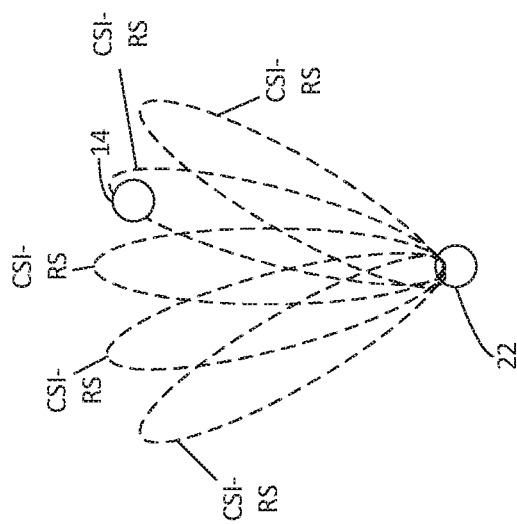
FIG. 12 is a diagram of example SSB burst transmissions.

Transmission of Channel State Information Reference Signals (CSI-RS) offers another example of transmission beamforming by TRPs 22 that may be adapted according the beam sweeping property reported by respective WCDs 14 or by a group or set of WCDs 14. Correspondingly, FIG. 12 illustrates the transmission by a TRP 22 of CSI-RS for a WCD 14 via a transmission beam sweep. Beam sweep parameters that may be configured for directional transmission of CSI-RS by the TRP 22 in dependence on one or more reception beamforming properties reported by a WCD 14 include, for example any one or more of the beamforming configuration parameters that define the transmission beam sweep used by the TRP 22 for the CSI-RS transmission. Non-limiting examples include any one or more of the beam size or shape, the number of beams included in the sweep, the beam directions used or prioritized, beam repetitions, and beam dwell time. The WCD 14 may signal to the network (NW) 12 that it supports digital beamforming and, correspondingly, the TRP 22 may transmit the CSI-RS as a single burst. In another case, the WCD 14 may signal that it operates with analog beamforming and requires six reception operations to cover its spatial range of interest. In that case, the TRP 22 may repeat its CSI-RS transmission in each transmission beam direction so as to allow the WCD 14 the chance to perform its reception operations for all six reception beams.

One or more TRPs 22 in the network 12 activate a CSI-RS beam sweep to support handover of a particular WCD 14, for example. Each TRP 22 may adapt its transmission beamforming configuration for the CSI-RS transmissions to account for the directional reception property/properties reported by the WCD 14. The indication of the beam sweeping property of the WCD 14 may be sent by the WCD 14 at the time of registration to the network 12 without presupposing any previous communication. The indication may be signaled unsolicited, as a part of the regular procedure, or it may be sent on request from the network 12, as an optional part of the procedure. Alternatively, the WCD 14 sends updated information, reflecting a changed capability or preference. The WCD 14 may use RRC signaling for such purposes. Updated information regarding the beam sweeping property of the WCD 14 may arise in the context of changed operating modes at the WCD 14, changed traffic patterns, changed antenna configurations, battery status, etc. Respective TRPs 22 in the network 12 can tailor their CSI-RS or other beamformed transmissions for the WCD 14 accordingly.

Figure 13:
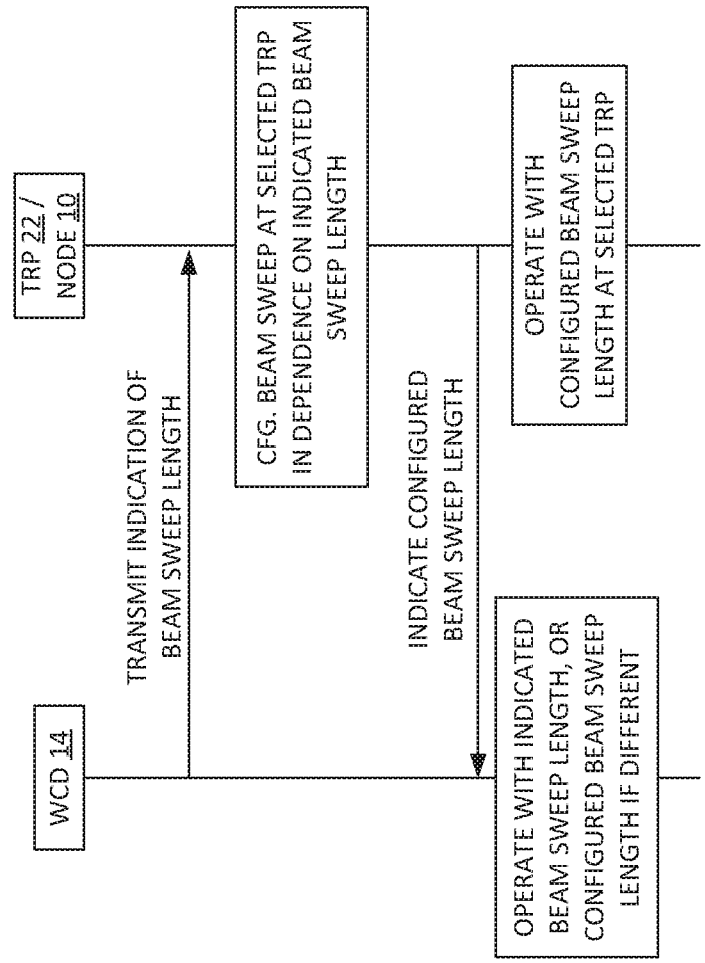
FIG. 13 is a signal flow diagram of an example embodiment of system operation involving a WCD and a network node.

FIG. 13 refers back to the earlier example of the WCD 14 transmitting an indication of its beam sweep length as a beam sweeping property, with the network node 10 configuring corresponding beam sweeping operations at a TRP 22 to use a configured beam sweep length. The configured beam sweep length at the TRP 22 matches the beam sweep length indicated by the WCD 14 or is compatible with it, and the network node 10 sends an indication of the configured beam sweep length to the WCD 14, e.g., via signaling transmitted by one or more of the TRPs 22. This indication from the network node 10 to the WCD 14 may be optional, unless the network node 10 wants to override the beam sweep configuration implied by the beam sweeping property signaled by the WCD to the network.

Also, as detailed earlier, the beam sweep length of the WCD 14 comprises the number of beams used by the WCD 14, with the overall duration of the sweep being dependent upon whether or what extent the WCD 14 supports simultaneous beams. By adapting the corresponding beam sweeping operations at a TRP 22 in dependence on the beam sweep length of the WCD 14 and its ability to receive in multiple directions simultaneously, the resource allocations can be limited or otherwise tailored to what is needed by the WCD 14, rather than making an allocation that provides for a worst-case or minimum capability scenario at the WCD 14. These adaptations thus improve efficiency regarding the transmission of downlink or uplink reference signals for mobility-related operations, improve cell or beam handover latency by shortening measurement periods when worst-case measurement intervals are not needed, and, overall, reduce resource usage in the network 12 regarding directional transmission or reception.

As a further working example, a WCD 14 determines the number of beams required to complete a beam sweep or determines a configuration parameter related to the number of required beams. The parameter may depend on the current beam sweep scenario or use case. In some cases, the underlying beam sweeping capability of the WCD 14 may be constant, not depending on the current scenario. For example, the WCD 14 supports some number of static or semi-static configurations. In an example case, the WCD 14 supports some number of beam sweep lengths and reports the lengths it supports.

The WCD 14 sends beam sweeping information that indicates, for example, the number of beams or a related parameter, as a beam sweeping property. Signaling of the property occurs at initial connection establishment, for example, when the WCD 14 accesses the network 12 from an idle state or an inactive mode. Additionally, or alternatively, the WCD 14 sends the signaling during connected-mode operation. As a general proposition, the WCD 14 indicates the beam sweeping property or properties at certain times, or when requested. The certain times may include an initial connection to the network 12, or reconnection occurring when the WCD 14 returns to network coverage after having lost its connection to the network 12. Other examples of triggered reporting of the parameter include reporting in conjunction with or in preparation for cell or beam handover.

Thus, in an example of device-side steps or operations undertaken by the WCD 14, the WCD 14: (a) determines a beam sweep length to cover its required angular range, which may depend on its current mode of operation, (b) signals the determined beam sweep length to the network 12, and (c) operates according to the reported beam sweep length, or a network-selected length in cases where the network 12 returns signaling indicating that a different beam sweep length should be used by the WCD 14.

Corresponding operations on the network side include a network node 10 receiving uplink signaling indicating the beam sweep length of a WCD 14. The signaling is received through a TRP 22 and the network node 10 may configured beam sweeping operations at that TRP 22 or another TRP 22, in dependence on the indicated beam sweep length. In particular, the network node 10 configures the beam sweep length of one or more TRPs 22, using the beam sweep length indicated by the WCD 14, or a length selected by the network node 10 in consideration of the indicated length. For example, consider a WCD 14 receiving data from the network 12 with analog beamforming (BF) that requires applying 16 different analog phase shift and combining setting, i.e., 16 different reception (RX) beam configurations, to provide sufficient link quality over the required reception angular range. Let each reception beam receive channel samples during two OFDM symbols. Then, upon receiving the indication of 16 beams from the WCD 14, the network node 10 configures a transmission (TX) beam sweep at one or more TRPs 22 to dwell on each transmit beam, e.g. by repeating the transmission, for the duration of the WCD beam sweep length, i.e., temporally corresponding to 16×2=32 OFDM symbols. As a further aspect of performing the configured beam sweeping at the TRP(s) 22, at least for transmission beamforming by the WCD 14 and corresponding reception beamforming by the TRP(s) 22, the involved network node(s) 10 may report the best beam direction or the more favorable beam directions, or return a list to the WCD 14, indicating beam indices and corresponding performance measures, as determined by the TRP(s) 22 for uplink reference signals directionally transmitted by the WCD 14.

Further as noted, the network node 10 may consider combinations of transmit and receive beamforming properties of the WCD 14. The network node 10 determines, for example, the beam sweep length to use for transmitting one or more types of downlink reference signals to the WCD 14, in dependence on one or more beam sweeping properties of the WCD 14 applicable to directional reception at the WCD 14. If the WCD 14 implements analog beamforming for directional reception, for example, the network node 10 in an example embodiment determines the beam width per sweep position and sets the number of sweep positions equal to the number of beams required to cover the relevant spatial region, e.g., a sphere or a half-sphere. If the WCD 14 implements digital beamforming for directional reception, the network node sets the number of sweep positions equal to one, because digital beamforming allows the WCD 14 to buffer digitized versions of the antenna-received signals corresponding to a given transmission instance and perform directional beamforming on the buffered signals.

As for example adaptations of receive beamforming at a TRP 22 in dependence on one or more uplink-related beam sweeping properties of the WCD 14, the network node 10 may allocate a number of time units for uplink reception in correspondence to the number of beams used by the WCD 14 to cover the relevant directions. If the WCD 14 implements analog beamforming for directional transmission, the network node 10 configures a corresponding reception beam sweep at one or more TRPs 22 by determining the beam width per sweep position and setting the number of sweep positions equal to the number of beams required to cover the relevant spatial region, e.g., a sphere or a half-sphere. If the WCD 14 implements digital beamforming for directional transmission, the network node 10 configures a corresponding reception beam sweep at one or more TRPs 22 by setting the number of sweep positions equal to the number of directions divided by the number of beams that can be transmitted simultaneously by the WCD 14.

In a further example embodiment, if the WCD 14 supports digital beamforming, or supports multiple panels for analog beamforming—the hybrid digital/analog case described earlier—the network node 10 allows frequency-division multiplexing of beam-swept signals transmitted for the WCD 14 and otherwise allows only time-division multiplexing for beam-swept transmissions targeting the WCD 14.

In the context of the specifications that define NR downlink reference signals of interest include the previously described SS/PBCH block (SSB), which may be transmitted using SSB bursts, comprised by a burst and or a set of bursts (SSB burst set). As noted, the network node 10 may adjust SSB transmission parameters, such as the number of beams, the number of bursts and/or the number of SSBs in a burst, in dependence on one or more reception beam sweeping properties of the WCD 14. Similar dependences may apply with respect to the number of Channel State Information (CSI) Reference Signal (RS) (CSI-RS) resource.

When determining the number of beams it requires to complete a beam sweep, the WCD 14 may consider the number of beams needed to span a defined angular range, its position in relation to the TRPs 22 from which reference signals are to be measured, or some subset of possible directions relating to the TRPs 22 to be measured, or in consideration of directions to be excluded. The number of beams may also be based on the angle spread in the transmission environment; a smaller number of beams may be used in cases with larger angle spread. In all cases, the determined number of beams also depends on the ability of the WCD 14 ability to form beams, e.g., the widest or the narrowest beam the WCD 14 can form. In the reception case, this ability, in turn, may depend on the required sensitivity and/or ability to receive a signal with a certain expected power at the receiver of the WCD 14. In the transmission case, it may depend on the transmission power per beam the WCD 14 can generate and a required (estimated) reception power at the intended receiver, which may be a targeted TRP 22.

The WCD 14 indicates the required number of beams explicitly or implicitly. In at least one embodiment, a set of configurations maps to respective beam sweeping patterns that, if supported by the WCD 14, can be signaled to the network 12. For example, in the case of CSI-RS transmissions transmitted by one or more TRPs 22 in the network 12, the WCD 14 signals its reception beam sweep property. In at least one example, this is signaled in the form of one out of a set of indexes, where each index maps to a respective reception beam sweeping pattern, e.g., in terms of number of reception beams, the duration of each reception beam, the angular width of each reception beam, the beam gain of each reception beam and/or the duration of the entire reception beam sweep.

Various possibilities for the nature of the beam sweeping property or properties indicated by the WCD 14 include, whether the WCD 14 uses analog or digital beamforming. Correspondingly, in an example of how the network node 10 may use such information, the network node 10 configures a corresponding beam sweep at a TRP 22 to use one sweep position in the case that the WCD 14 uses digital beamforming, and to use a defined maximum number of beam positions in the case that the WCD 14 uses analog beamforming. Other signal beam sweeping properties include maximum, minimum, or preferred or typical beam width, such that the number of beams required by the WCD 14 to complete a beam sweep may be inferred by the network node 10.

As a further example, the WCD 14 may indicate its maximum beam gain, from which the network node 10 infers the number of beams required by the WCD 14 to complete a beam sweep. Inferring in this manner may be based on the beam gain required for coverage in the given deployment scenario.

In another example, the WCD 14 indicates the size of its antenna array and the network node 10 infers the number of beams available for sweeping in the relevant directions, based on the indicated array size. The size here may be an overall size or the size of the currently-active subarray of antenna elements. Continuing the example, the network node 10 can determine the range of transmit beam widths formable by the WCD 14, based on knowledge of the involved channel and beam gains. That information allows the network node 10 to determine the beam widths required for a beamformed uplink signal transmitted by the WCD 10 to reach a targeted TRP 22 with sufficient power and, from that determination, determine the number of transmit beams required at the WCD 14 to sweep over the relevant directions.

In another aspect, a network node 10 in the network 12 that receives beam sweeping information for a WCD 14 stores that information, either locally, or by providing it to another node, such as a Mobility Management Entity (MME) or Mobility Function (MF). Such information can be transferred to any other network node 10 and/or TRP 22 when a context for the WCD 14 is established in the other TRP 22. The beam sweeping information, therefore, can be stored in and distributed within the RAN 20 and/or CN 26, such that it "follows" mobility of the WCD 14 through the network 12. That approach makes the beam sweeping information of the WCD 14 available in the network 12 for as long as the WCD 14 remains attached to the network 12, even when the WCD 14 is in an idle state, such as the RRC_IDLE state, where "RRC" refers to Radio Resource Connection.

The WCD 14 also may be configured to signal its beam sweeping information on a more dynamic basis, e.g., prior to a mobility measurement or handover execution. In one example, the WCD 14 chooses a scrambling sequence to use for Physical Uplink Control Channel transmission, or for PUCCH Demodulation Reference Signal (DMR) transmission. With different scrambling sequences mapping or pointing to different beam sweeping properties, the WCD 14 implicitly indicates one or more beam sweeping properties, based on which scrambling sequence it chooses.

In a case where the WCD 14 signals its beam sweeping information in conjunction with or in preparation for a cell or beam handover, a network node 10 may use the information to configure repetitions of CSI-RS transmissions active for measurement on cells or beams that are potential handover candidates or are already selected. Such operations have relevance in inter-gNB handover situations, where the CSI-RSs will be transmitted from neighbor gNBs. The gNBs may each operate as a TRP 22 with the integrated functionality of the network node 10. However, such operations are also relevant in handover involving DUs that are controlled by the same CUs. The number of configured repetitions of each CSI-RS transmission from a CU would be equal to the number of reception beams indicated by the WCD 14.

Also, in the handover context, the WCD 14 may have some rough notion of the directions that it should use for attempting to receive CSI-RS from TRPs 22 that are candidates for the handover, or it may at least be able to exclude certain directions. As such, the number of beams required for directional reception at the WCD 14 may be dependent on the WCD 14 having enough information to restrict its beam sweep to a smaller angular range that it might use absent such information.

In another example, the WCD 14 signals its lack of support of for directional reciprocity, along with the number of transmit beams it requires to cover all relevant directions for Physical Random Access Channel (RACH) transmission. One or more network nodes 10 in the network 12 use the signaled information to allocate repeated PRACH resources, e.g., the number of allocated RACH resources equals the number of transmit beams to be used by the WCD 14. This arrangement can be applied to a handover scenario, e.g., to provide for use by the WCD 14 of contention-free preamble transmissions while in connected mode.

Continuing with the handover context, in one or more embodiments, the WCD 14 indicates the number of reception directions it will scan for signals from TRPs 22 as handover candidates, and the network node(s) 10 responsible for or integrated into those TRPs 22 configure reference signal transmission from the TRPs 22 accordingly. In contrast, when initially connecting, the WCD 14 may have no sense of which directions to try and may determine its required number of beams based on a full angular range, e.g., a sphere or a half-sphere.

Similarly, the WCD 14 may signal the number of transmission beams it requires to cover all relevant or all possible directions when transmitting uplink reference signals in a transmission beam sweep.

The signaling of a beam sweeping property and adaptation of a beam sweep configuration in accordance with the signaled beam sweeping property may also be used in the context of beam refinement. When beam refinement is performed, i.e., refinement in terms of direction (and/or beam width) of an already existing beam being used, beam directions close to the currently used one are tried to see if any of them performs better (i.e., achieves overall better channel quality, including the beam gain). When only the reception beam is to be refined and the receiver uses analog reception beamforming, the transmitter can transmit a certain signal, e.g., a reference signal such as a CSI-RS, a number of times, e.g., N times, so that the receiver can receive it using N different reception beams, e.g., trying N different reception beam directions. If any of the tried reception beams performs better than the one currently being used, the one that performed the best replaces the current one.

If a transmission beam is to be refined and the transmitter uses analog beamforming, the transmitter. e.g. a network node, such as a TRP, transmits a certain signal. e.g. a reference signal such as a CSI-RS, a number of times, e.g., N times, trying N beam directions close to the one currently being used. The receiver, e.g., a WCD 14, can then receive and measure the perceived channel quality on all the transmissions. The result is fed back to the transmitter, i.e., the receiver signals the result of the measurements to the transmitter. If any of the tried transmission beams performed better than the one currently being used, the one that performed the best (i.e., the one that resulted in the best channel quality according to the measurements) replaces the current one.

If both reception and transmission beams are to be refined in a common procedure and the transmitter uses analog beamforming and the receiver uses analog reception beamforming, then the number of transmissions are multiplied by the number of reception beams to try. That is, all reception beam directions have to be tried for reception of each of the transmission beams. Hence, if N transmission beams and M reception beams are to be tried/evaluated then the transmitter has to transmit M times in each of the N transmission directions, i.e., altogether M×N transmissions. The beam pair (i.e., pair of transmission beam and reception beam) that performs the best will thereafter be used (and this could turn out to be the one already being used if none of the other tried beam combinations performed better.

Note that the transmitter in the above examples may also be a WCD 14 and, correspondingly, the receiver may be a network node, such as a TRP 22. In such a case, the transmitted signal may e.g. be a sounding reference signal (SRS).

With reference back to FIG. 12, consider an example where the WCD 14 indicates that it uses analog beamforming for CSI-RS reception. A network node 10 exploits knowledge of that property when configuring the CSI-RS transmissions from one or more TRPs 22, for beam refinement or adaptation. For instance, the network node 10 configures a TRP 22 to try each downlink (DL) transmission beam direction twice for the WCD 14 to measure on with the two reception beams that are adjacent to the current one. Alternatively, as another example, the TRP 22 tries each downlink transmission beam direction four times and the WCD 14 tries four adjacent beams for each transmission direction, if the elevation/polar angle of the DL beam is to be adjusted/refined and four reception beams are evaluated. The WCD 14 may signal the number of reception beam directions (e.g., 2, 3, 4 or 5) it wants to evaluate in a reception beam refinement procedure, so that the network node 10 can adapt the number of CSI-RS transmission repetitions accordingly. In a pure WCD reception beam refinement case, a TRP 22 would repeat the CSI-RS transmissions in a single downlink beam direction (i.e., the current one). However, WCD reception beam refinement and network (e.g. TRP) transmission beam refinement may also be combined and performed together. In such cases, a TRP 22 would perform CSI-RS transmissions in multiple different downlink beam directions (typically close to the current downlink beam direction), repeating the transmission in each beam direction the number of times indicated by the signaled beamforming capability of the WCD 14, i.e., in this case, the number of reception beam directions the WCD will/wants to evaluate. As an option, the WCD 14 may then also signal how many downlink beam directions different from the current one it wants to evaluate (and provide feedback to the network node 10).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operation by a network node in a wireless communication network, the method comprising:
   receiving beam sweeping information from a wireless communication device, indicating a beam sweeping property of the device with respect to performing directional reception or transmission; and
   determining a beam sweep configuration to be used by a Transmission/Reception Point, TRP, in the network with respect to the device, in dependence on the beam sweeping property,
   wherein the beam sweeping property indicates how many transmit beam directions are used by the device simultaneously for performing a transmission beam sweep, and wherein determining the beam sweep configuration comprises determining whether or to what extent to use beam repetition when performing a reception beam sweep for the device, in dependence on the number of transmit beam directions simultaneously used by the device.

2. The method of claim 1, wherein the beam sweeping property relates to an ability of the device to perform directional reception or transmission in more than one direction simultaneously, and wherein determining the beam sweep configuration to be used by the TRP in the network with respect to the device comprises determining a Frequency Division Multiplexing, FDM, dimension and a Time Division Multiplexing, TDM, dimension for the TRP to use when performing a transmission or reception beam sweep with respect to the device.

3. The method of claim 2, further comprising allocating radio resources in frequency and time for the transmission or reception beam sweep, in dependence on the FDM and TDM dimensions.

4. The method of claim 1, wherein the beam sweeping property depends on whether the device uses radiofrequency, RF, or baseband beamforming for reception, and wherein determining the beam sweep configuration comprises determining whether or to what extent to use beam repetition when performing a transmission beam sweep for the device.

5. The method of claim 4, wherein, responsive to the beam sweeping property indicating that the device uses RF beamforming for reception, determining whether or to what extent to use beam repetition when performing the transmission beam sweep for the device comprises configuring the transmission beam sweep to use beam repetition.

6. The method of claim 5, wherein the beam sweeping information indicates the number of reception beams used by the device to span an angular range, and wherein the method further comprises configuring the number of beam repetitions used in the transmission beam sweep in dependence on the number of reception beams used by the device.

7. The method of claim 4, wherein, responsive to the beam sweeping property indicating that the device uses baseband beamforming for reception, determining whether or to what extent to use beam repetition when performing the transmission beam sweep for the device comprises configuring the transmission beam sweep without the use of beam repetition.

8. The method of claim 1, wherein the beam sweeping property is a beam sweep length, the beam sweep length being the number of time intervals required by the device to perform a reception beam sweep or a transmission beam sweep over an angular range, and wherein determining the beam sweep configuration to be used by the TRP in the network with respect to the device comprises configuring the TRP to use a reception or transmission window length that matches the beam sweep length, or is supported by the device, as determined from the beam sweep length.

9. A network node configured for operation in a wireless communication network, the network node comprising:
   communication circuitry configured for wireless communication with wireless communication devices, or configured for inter-nodal communication with another network node in the network that is configured for wireless communication with wireless communication devices; and
   processing circuitry operatively associated with the communication circuitry and configured to:
      receive beam sweeping information from a wireless communication device, indicating a beam sweeping property of the device with respect to performing directional reception or transmission; and
      determine a beam sweep configuration to be used by a Transmission/Reception Point, TRP, in the network with respect to the device, in dependence on the beam sweeping property,
   wherein the beam sweeping property indicates how many transmit beam directions are used by the device simultaneously for performing a transmission beam sweep, and wherein the processing circuitry is configured to determine the beam sweep configuration by determining whether or to what extent to use beam repetition when performing a reception beam sweep for the device, in dependence on the number of transmit beam directions simultaneously used by the device.

10. The network node of claim 9, wherein the beam sweeping property relates to an ability of the device to perform directional reception or transmission in more than one direction simultaneously, and wherein the processing circuitry is configured to determine the beam sweep configuration to be used by the TRP in the network with respect to the device by determining a Frequency Division Multiplexing, FDM, dimension and a Time Division Multiplexing, TDM, dimension for the TRP to use when performing a transmission or reception beam sweep with respect to the device.

11. The network node of claim 10, wherein the processing circuitry is configured to allocate radio resources in frequency and time for the transmission or reception beam sweep, in dependence on the FDM and TDM dimensions.

12. The network node of claim 9, wherein the beam sweeping property depends on whether the device uses radiofrequency, RF, or baseband beamforming for reception, and wherein the processing circuitry is configured to determine the beam sweep configuration by determining whether or to what extent to use beam repetition when performing a transmission beam sweep for the device.

13. The network node of claim 12, wherein, responsive to the beam sweeping property indicating that the device uses RF beamforming for reception, the processing circuitry is configured to configure the transmission beam sweep to use beam repetition.

14. The network node of claim 13, wherein the beam sweeping information indicates the number of reception beams used by the device to span an angular range, and wherein the processing circuitry is further configured to configure the number of beam repetitions used in the transmission beam sweep in dependence on the number of reception beams used by the device.

15. The network node of claim 12, wherein, responsive to the beam sweeping property indicating that the device uses baseband beamforming for reception, the processing circuitry is configured to configure the transmission beam sweep without the use of beam repetition.

16. The network node of claim 9, wherein the beam sweeping property is a beam sweep length, the beam sweep length being the number of time intervals required by the device to perform a reception beam sweep or a transmission beam sweep over an angular range, and wherein the processing circuitry is configured to determine the beam sweep configuration to be used by the TRP in the network with respect to the device by configuring the TRP to use a reception or transmission window length that matches the beam sweep length, or is supported by the device, as determined from the beam sweep length.

17. A wireless communication system comprising:
a wireless communication device comprising:
communication circuitry configured for wireless communication with transmission/reception points, TRPs, in a wireless communication network; and
processing circuitry operatively associated with the communication circuitry and configured to:
determine a beam sweeping property of the device with respect to the device performing directional reception or transmission; and
transmit beam sweeping information indicating the beam sweeping property, for use by a network node in the network in configuring a beam sweep to be used by a TRP in the network, with respect to the device performing the directional reception or transmission; and
the network node configured for operation in the network and operative as or associated with the TRP and comprising:
communication circuitry configured for wireless communication with the device as said TRP, or configured for inter-nodal communication with the TRP; and
processing circuitry operatively associated with the communication circuitry and configured to:
receive the beam sweeping information; and
determine a beam sweep configuration to be used by the TRP with respect to the device, in dependence on the beam sweeping property,
wherein the beam sweeping property indicates how many transmit beam directions are used by the device simultaneously for performing a transmission beam sweep, and wherein the processing circuitry is configured to determine the beam sweep configuration by determining whether or to what extent to use beam repetition when performing a reception beam sweep for the device, in dependence on the number of transmit beam directions simultaneously used by the device.

* * * * *